United States Patent [19]

Wilson

[11] 4,377,724
[45] Mar. 22, 1983

[54] SPACE DIVIDER WALL STRUCTURE WITH MULTIPLE CIRCUIT POWER SYSTEM

[75] Inventor: Harold R. Wilson, Holland Township, Ottawa County, Mich.

[73] Assignee: Haworth Mfg., Inc., Holland, Mich.

[21] Appl. No.: 56,198

[22] Filed: Jul. 10, 1979

Related U.S. Application Data

[63] Continuation of Ser. No. 854,685, Nov. 25, 1977, abandoned.

[51] Int. Cl.³ ............................................. H02G 3/00
[52] U.S. Cl. .................................... 174/48; 339/22 R
[58] Field of Search ................. 174/48, 49; 339/22 R, 339/23; 160/127, 135, 351; 52/220, 221, 173, 239

[56] References Cited

U.S. PATENT DOCUMENTS

| | | | |
|---|---|---|---|
| 2,086,641 | 7/1937 | Riley . | |
| 2,312,580 | 3/1943 | O'Brien | 339/22 R |
| 2,313,452 | 3/1943 | O'Brien | 339/22 R |
| 2,313,960 | 3/1943 | O'Brien | 339/23 |
| 3,248,576 | 4/1966 | Russell | 307/147 |
| 3,683,101 | 8/1972 | Liberman | 174/49 |
| 3,715,627 | 2/1973 | D'Ausilio | 174/48 X |
| 3,719,768 | 3/1973 | Jonsson | 174/49 |
| 3,856,981 | 12/1974 | Boundy | 174/48 |
| 3,984,621 | 10/1976 | Propst | 174/48 |
| 3,990,204 | 11/1976 | Haworth et al. | 52/239 |
| 4,001,571 | 1/1977 | Martin | 240/9 R |
| 4,030,219 | 6/1977 | Donovan | 160/135 X |
| 4,043,626 | 8/1977 | Propst et al. | 339/23 |
| 4,056,297 | 11/1977 | Gartung | 339/23 |
| 4,060,294 | 11/1977 | Haworth et al. | 339/22 R X |
| 4,135,775 | 1/1979 | Driscoll | 339/22 R |
| 4,146,287 | 3/1979 | Jonsson | 339/75 M |
| 4,199,206 | 4/1980 | Haworth et al. | 339/23 X |

FOREIGN PATENT DOCUMENTS

47852 1/1965 Luxembourg .

*Primary Examiner*—B. A. Reynolds
*Assistant Examiner*—D. A. Tone
*Attorney, Agent, or Firm*—Blanchard, Flynn, Thiel, Boutell & Tanis

[57] ABSTRACT

A space divider system which is substantially freestanding and is formed from a plurality of interconnected prefabricated panels. The panels are individually electrically prewired, and flexible electrical connectors are releasably connected to adjacent panels for transmitting electrical energy between said panels. The individual panels, and the power supply to at least one of the panels, involves a multiple-wire system which provides two or more electrical circuits. The individual panels possess power blocks having socketlike receptacles for permitting adjacent panels to be electrically connected by the flexible connectors. A second socketlike receptacle is associated with some power blocks for permitting connection to external electrical devices, and a third receptacle is associated with some power blocks for permitting connection to light fixtures mounted on the panels. The second and third receptacles are associated with different electrical wires which define different electrical circuits. Alternately, the internal wiring associated with some of the flexible connectors can be reversed to provide a first series of panels connected to a first electrical circuit, and a further series of panels connected to a different electrical circuit.

7 Claims, 11 Drawing Figures

SPACE DIVIDER WALL STRUCTURE WITH MULTIPLE CIRCUIT POWER SYSTEM

This is a continuation of application Ser. No. 854,685, filed Nov. 25, 1977, now abandoned.

FIELD OF THE INVENTION

This invention relates to a wall or space divider system incorporating a plurality of prefabricated panels which have structures associated therewith for facilitating the electrical prewiring of the wall system.

BACKGROUND OF THE INVENTION

Copending applications Ser. No. 615,506 and 737,420, now U.S. Pat. Nos. 4,060,294 and 4,199,206, respectively, both owned by the Assignee of this application, disclose space-divider wall structures which include a plurality of prefabricated panels releasably joined together and individually electrically prewired to facilitate the supplying of electrical energy to regions bounded by the wall structure. These wall structures also accommodate communication cables therein. While the wall structures of the above applications are highly desirable, nevertheless continued development has been carried out to further improve these structures.

The present invention thus relates to a wall structure of the type disclosed in application Ser. No. 737,420, but wherein additional improvements have been made in this wall structure, particularly with respect to the electrical prewiring of the individual panels and the resulting electrical system resulting therefrom, so as to greatly expand the capability, usability, adaptability and convenience of the wall structure.

Accordingly, it is an object of the present invention to provide an improved wall structure formed from a plurality of prefabricated panels releasably joined together, which panels are individually electrically prewired to facilitate the supplying of electrical energy to regions adjacent the wall structure. More specifically, it is an object of the present invention to provide a wall structure of this type which is prewired to provide two or more electrical circuits which are designed so that the wall structure can thus be easily assembled and interconnected in such a manner as to increase the number of panels which can be effectively connected in series so that a first plurality of series-connected panels can be provided with one electrical circuit and serially interconnected to a second plurality of series-connected panels which are provided with a second electrical circuit. This thus permits the wall structure to be adapted for use in much larger areas while permitting the use of fewer power inputs to the wall structure, and at the same time providing sufficient external electrical sockets associated with different electrical circuits so as to permit proper connection of necessary equipment such as typewriters and the like.

A further object of the present invention is to provide an improved wall structure, as aforesaid, which permits one circuit to be provided solely for connection to external sockets which are connectible to external electrical equipment such as typewriters and the like, while providing a seaprate electrical circuit which is associated with the internal wall structure of the panel and can thus be easily utilized for supplying energy to lighting fixtures and the like as mounted on or directly associated with the panels. This substantially improves the flexibility and adaptability of the system while minimizing the number of electrical inputs which must be connected to the wall structure.

Still a further object of the invention is to provide an improved wall structure, as aforesaid, which provides for substantial adaptability and capability in the electrical system without requiring any substantial manual labor and/or installation of electrical conduits and the like during assembly and installation of the wall structure.

Other objects and purposes of the invention will be apparent to presons familiar with systems of this type upon reading the following specification and inspecting the accompanying drawings.

Certain terminology will be used in the following description for convenience in reference only and will not be limiting. For example, the words "upwardly", "downwardly", "rightwardly", and "leftwardly" will refer to directions in the drawings to which reference is made. The words "inwardly" and "outwardly" will refer to directions toward and away from, respectively, the geometric center of a panel and designated parts thereof. Said terminology will include the words specifically mentioned, derivatives thereof, and words of similar import.

SUMMARY OF THE INVENTION

A plurality of prefabricated panels are selectively connected together to form a substantially freestanding wall structure having a desired length and configuration. In a preferred embodiment, each panel has a raceway fixed to and extending along the lower edge thereof, and terminating in power blocks disposed adjacent the opposite lower corners of the panel. Some of the power blocks associated with the wall structure have a conventional electrical socket associated with one or both sides thereof to permit a conventional electrical plug to be inserted therein. Electrical cables extend through the raceway and are connected to the power blocks for transmission of electrical energy. The power blocks have side recesses formed therein, preferably on each side of the power block, whereby a flexible electrical connector can be disposed within the recesses of two adjacent power blocks for electrically connecting adjacent panels. The power blocks and flexible electrical connector have cooperating parts which define a separable electrical connection, such as a plug-and-socket connection. The flexible electrical connector, the power blocks and the cables within the raceways, define two or more separate electrical circuits. A multiwire electrical supply cable is releasably connected to one of the power blocks to thereby electrically energize the two or more circuits. The sockets associated with the power blocks in the series of panels are all normally connected to a single electrical circuit. However, by crossing the internal wiring associated with one of the flexible electrical connectors, then the sockets associated with the power blocks can be connected to at least two different circuits so that a larger number of panels and a larger number of external sockets can be connected in series while still being connected to only a single power source. Further, it is preferable that at least one power block of each panel have a further interior recess defining a receptacle in which a separable pluglike part can be disposed and internally electrically connected to a lighting fixture or the like as mounted on the respective panel. The lighting fixture, and the plug part which joins to the power block, are connected to a circuit which is different from that connected to the external sockets.

DETAILED DESCRIPTION

Figure 1:
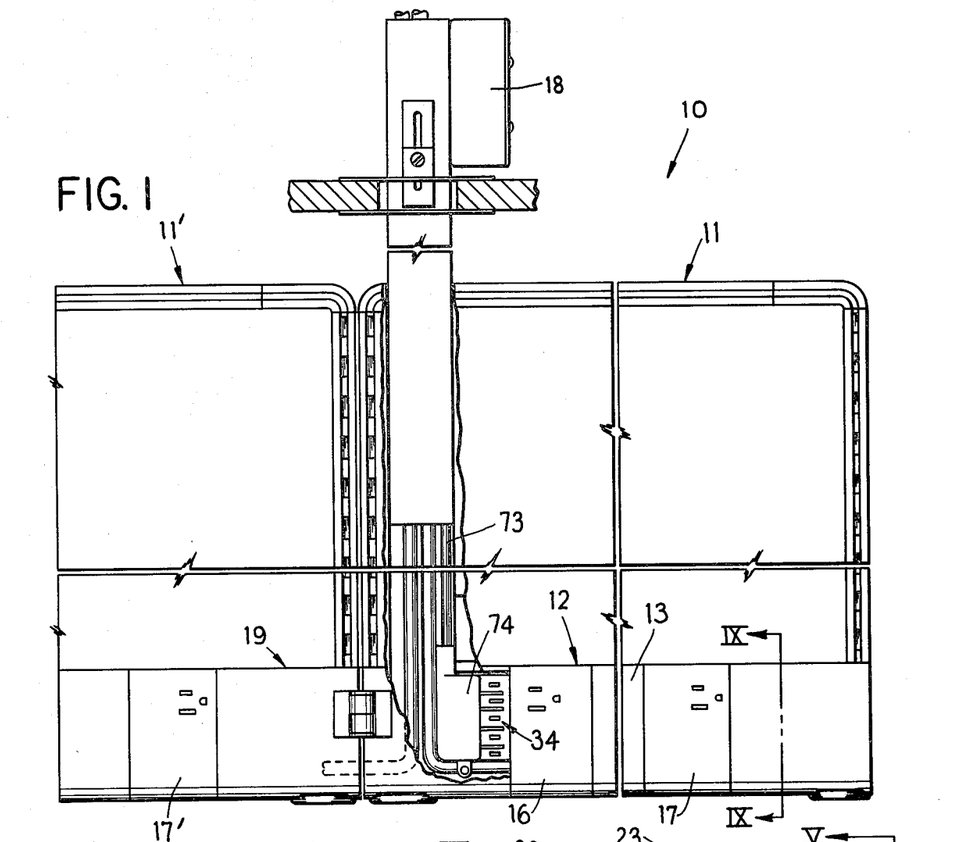
FIG. 1 is a fragmentary elevational view of a wall system formed from two interconnected prefabricated panels, the outer skin of the rightward panel being partially removed to permit illustration of the interior structure.

FIG. 1 illustrates a wall structure 10 formed by a series of interconnected upright prefabricated wall panels, only two panels 11 and 11' being illustrated. The panels are all of substantially identical construction, although panels of different lengths can be serially interconnected.

Each panel, such as panel 11, is provided with a prewired electrical system 12 which includes an elongated raceway 13 fixed to the panel and extending longitudinally along the lower edge thereof. This raceway terminates at substantially identical power blocks 16 and 17 disposed adjacent the opposite lower corners of the panel. Suitable wires or cables extend through the raceway for electrically connecting the power blocks 16 and 17. In addition, the power blocks of adjacent panels, such as the blocks 16 and 17' illustrated in FIG. 1, are structurally and electrically joined together by a flexible electrical connector 19 to permit electrical energy to be transmitted between adjacent panels. Electrical energy is supplied to one of the series-connected panels from a suitable power supply junction box, such as the junction box 18 which may be disposed in the ceiling as illustrated in FIG. 1, with electrical power being transmitted from the junction box downwardly to one of the power blocks by means of an electrical connection which extends interiorly of the panel.

The overall structure of panel 11, and the general overall arrangement of the prewired electrical system 12 associated therewith, is illustrated and described in copending application Ser. No. 737,420.

Referring to FIGS. 2–6, the power block 16 (which is substantially identical to power block 17) includes a hollow boxlike housing 21 formed of an electrically insulative material and having opposed and substantially parallel sidewalls 22 and 23. These sidewalls, on some of the power blocks, are provided with a conventional electrical socket 24 adapted to receive a conventional two or three-prong electrical plug. A first blocklike portion 26 is integral with the housing 21 and projects outwardly from one end thereof, and is spaced inwardly from the housing sidewalls 22 and 23. A second blocklike portion 27 projects outwardly beyond the end of the first blocklike portion 26 and is recessed inwardly from one sidewall thereof. This structure results in the end of the power block having substantially identical recesses 28 and 29 (FIG. 2) disposed on opposite corners thereof, with a further recess 31 projecting inwardly from the bottom of the recess 28.

The blocklike portion 26 is defined between substantially parallel sidewalls 32 and 33 (FIG. 4) which are substantially parallel with and spaced inwardly from the housing sidewalls 22 and 23. The sidewalls 32 and 33 respectively define the rear wall of the recesses 28 and 29. Each of sidewalls 32 and 33 has electrical connecting means 34 (FIG. 3) associated therewith, which connecting means is adapted for cooperation with the flexible electrical connector 19. The connecting means 34 includes both male and female portions, with the female portion defining a socket-type receptacle formed by five elongated slots 35–39 which are disposed in vertically spaced and parallel relationship. Connecting means 34 also include four electrically conductive prongs 41–44 which project perpendicularly outwardly from the respective sidewall (for example sidewall 32). The prongs 41–44 are respectively associated with the slots 35, 37, 38, and 39.

Figure 2:
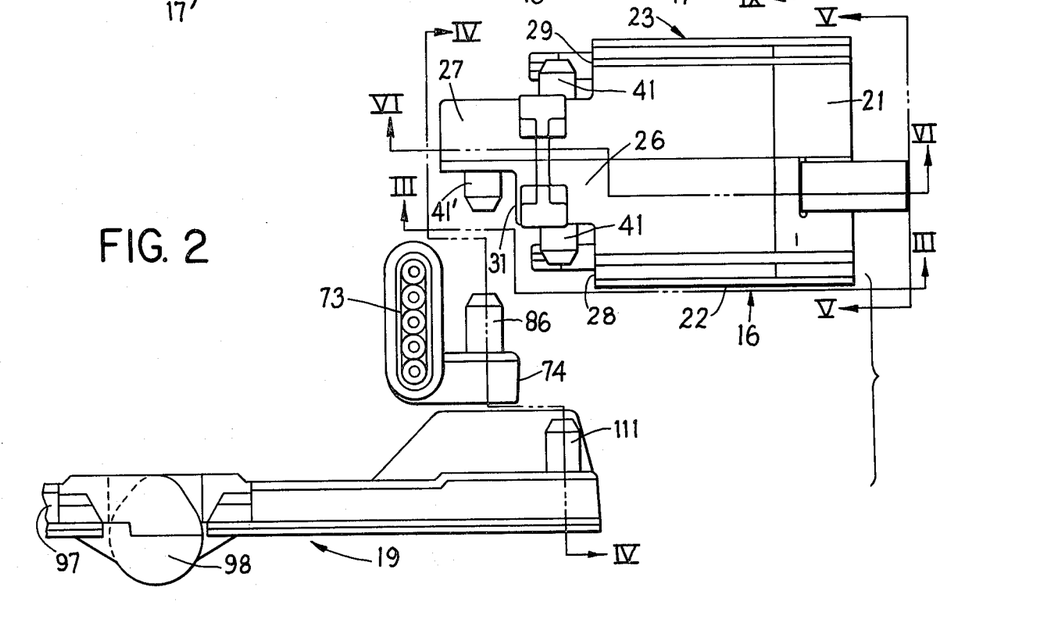
FIG. 2 is an enlarged top view of the power block, power connector and flexible connector shown in a separated condition.
Figure 3:
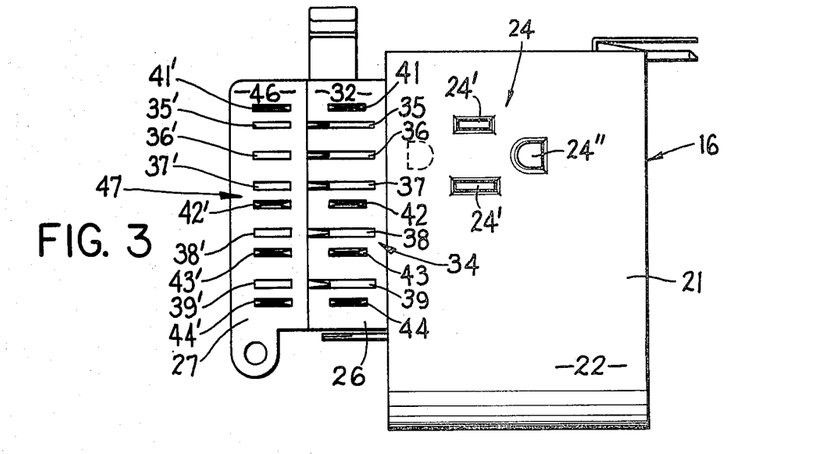
FIGS. 3, 4, 5 and 6 are views taken along the lines III—III, IV—IV, V—V and VI—VI, respectively, in FIG. 2.

The second blocklike portion 27, which has a rear sidewall 46 parallel to but spaced inwardly from the sidewall 32, also has an electrical connecting means 47 associated therewith. The electrical connecting means 47 is constructed identically to the electrical connecting means 34 so as to include a female or socket-type receptacle formed from five vertically spaced slots 35'–39' and a male portion formed from four electrically conductive prongs 41'–44'.

All of the prongs 41–44 which project outwardly from the sidewall 32 are respectively insulated from one another and insulated from the prongs 41–44 which project outwardly from the opposite sidewall 33. All of these prongs are also insulated from the prongs 41'–44'.

The power block housing 21 (FIG. 6) contains therein five electrically conductive members 51–55 which are disposed vertically one above the other and individually formed from a copper plate which is suitably deformed to have the desired configuration. These plates, which are electrically insulated from one another, are all identical except for plate 52 which functions as the ground element. For this reason, the ground plate 52 is shaped so as to define therein a socket part 24" which forms a portion of the receptacle 24. Ground plate 52 additionally defines the slots 36 and 36'. The upper conductive plate 51 defines therein a slot 24' associated with the receptacle 24, and also defines the slots 35 and 35'. In a similar manner the conductive plate 53 defines a further slot 24' associated with the receptacle 24, and also defines the slots 37 and 37'. The remaining conductive plates 54 and 55 respectively define the slots 38-38' and 39-39'. The ground plate 52 also has a top tab 52' which is suitably secured, as by a screw, to the bottom rail of the panel frame, whereby the power blocks disposed adjacent the opposite corners of the panel are thus connected to a common ground.

The conductive plates 51, 53, 54 and 55 in power block 16 are respectively electrically connected to the corresponding conductive plates provided in the power block 17 by electrical cables 56–59 which extend through the raceway 13. For this purpose, the end of the power block housing has identical sets of openings 61–64 (FIG. 5) disposed adjacent the opposite sides thereof, and the electrical cables 56–59 project through the openings of one of these sets and are electrically connected to the conductive plates 51 and 53–55.

Figure 9:
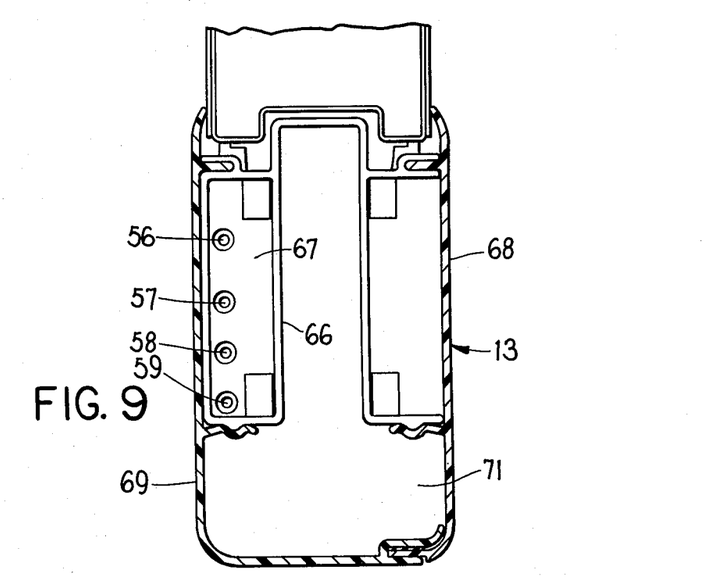
FIG. 9 is a fragmentary sectional view taken along line IX—IX in FIG. 1.

As illustrated in FIG. 9, the raceway 13 includes a raceway member 66 which is secured to the lower framing rail of the panel and extends longitudinally therealong and interconnects the opposite power blocks 16 and 17. This raceway member 66 defines therein a first substantially closed channel 67 through which the electrical cables 56–59 extend. The raceway 13 further includes a pair of removable side covers 68 and 69 which are approximately flush with the opposite sides of the panel and releasably engage and are supported on the raceway member 66. These removable side covers 68 and 69 cooperate with one another and with the raceway member 66 so as to define a further substantially closed channel 71 which also extends longitudinally of the raceway. This channel 71, which is separate from the channel 67, permits communication cables and the like to be positioned therein and extend longitudinally along and between panels while being effectively hidden from view. These communication cables can, however, be readily interchanged and serviced due to the removability of the side covers 68 and 69.

To permit the power blocks associated with the wall structure to be energized, one of the power blocks is connected to an external power source, such as the ceiling-mounted junction box 18 (FIG. 1). A multi-wire electrical conductor 73 (FIGS. 1 and 2) is joined to the junction box 18 and projects downwardly through the interior of the panel 11, such as through the interior of one of the frame side rails. The lower end of this conductor 73 has a power connector 74 provided thereon, which connector is in the form of a multi-prong plug adapted for engagement with the connecting means 47 associated with the power block 16.

The power connector 74 comprises a hollow blocklike housing 76 (FIG. 4) constructed of an electrically insulative material and having five electrical conductors 81–85 supported therein, which five conductors are individually electrically connected to one of the wires associated with the conductor 73, which conductor is a five-wire conductor in the illustrated embodiment. The housing 76 also mounts thereon five electrically conductive prongs 86–90 which project transversely outwardly from the face of the housing and are disposed in vertically spaced and parallel relationship. The prong 87 is fixedly connected to the conductor 82, which conductor is in turn connected to the ground wire associated with the conductor 73. The remaining conductors 86 and 88–90 are all associated with and positioned closely adjacent but slightly spaced from the respective conductors 81 and 83–85, thereby defining gaps therebetween which are aligned with slots 91–94 formed in the housing.

Figure 4:
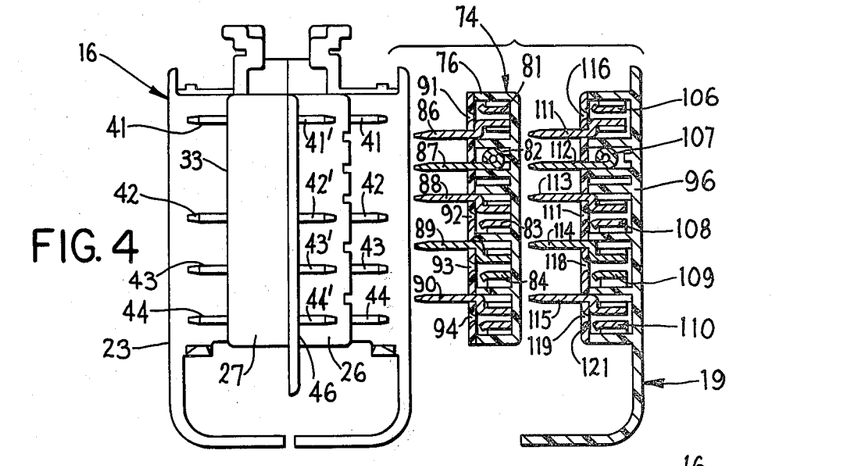
Figure 5:
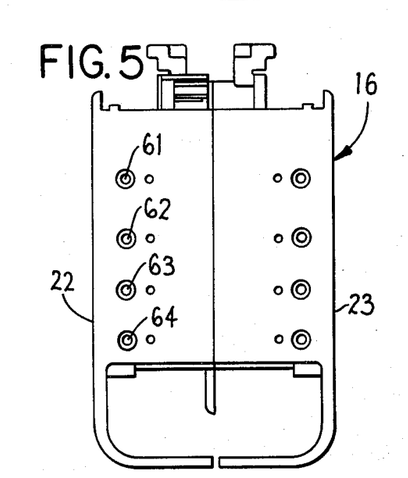
Figure 6:
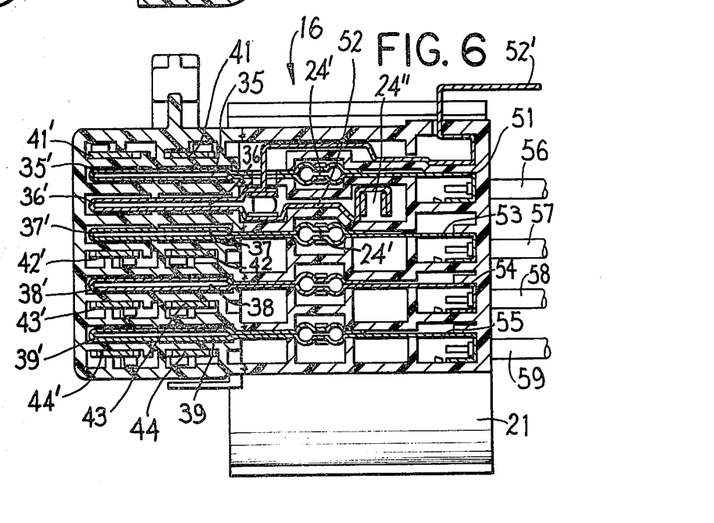

The power connector 74 is designed to fit within the recess 31 as formed in the power block, whereby the connecting means 47 on the power block coacts with the power connector 74 for permitting transfer of electrical energy from the conductor 73 to the power block. This is accomplished by inserting the prongs 86–90 of the connector 74 respectively into the slots 35'–39' so that these prongs thus individually respectively engage the conductive plates 51–55. This insertion simultaneously results in the prongs 41'–44' being inserted respectively through the slots 91–94, thereby spanning the gaps formed in the power connector 74 so that the prongs 86, 88, 89 and 90 are respectively electrically connected to the adjacent conductors 81, 83, 84 and 85. In this manner, all of the prongs 41'–44' and 86–90 are electrically deenergized whenever the power connector 74 is separated from the power block.

Figure 8:
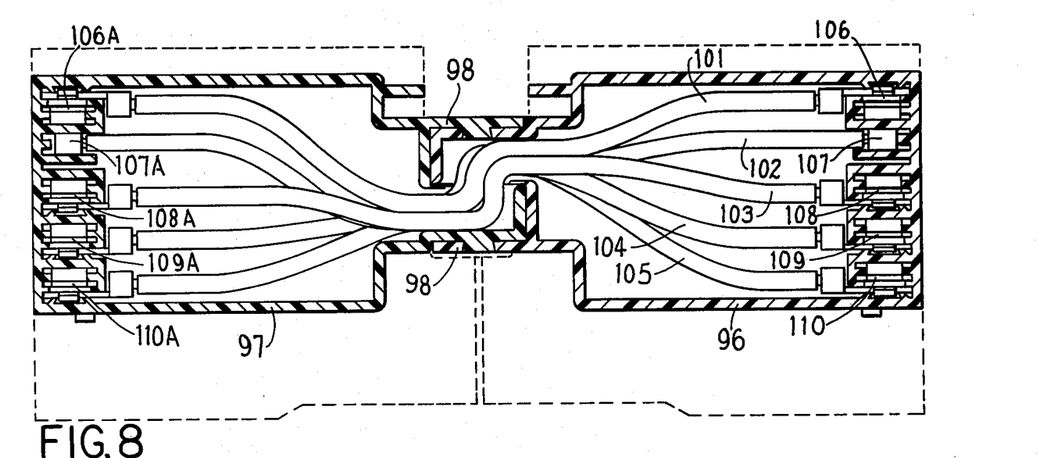
FIG. 8 is a sectional view taken along line VIII—VIII in FIG. 7.

Considering now the flexible electrical connector 19, same includes a pair of boxlike hollow housings 96 and 97 (FIG. 8) formed of an electrically insulative material. These housings have cooperating partially cylindrical hinge portions 98 which are disposed in relative rotational supporting engagement with one another for permitting the housings 96 and 97 to swingably move about a substantially vertical hinge axis defined by the portions 98.

The illustrated electrical connector 19 has five flexible electrical wires 101–105 positioned therein and extending through the hinge portions. The opposite ends of wire 101 are connected to electrical conductors 106 and 106A, and the remaining wires 102–105 similarly have the opposite ends thereof connected to conductors 107–107A, 108–108A, 109–109A and 110–110A, respectively. The set of conductors 106–110 is associated with a set of electrically conductive prongs 111–115 (FIG. 4), and the other set of conductors 106A–110A is similarly associated with a further identical set of electrically conductive prongs.

As shown in FIG. 4, the prong 112 is connected to, and effectively integral with, the conductor 107, and thus effectively functions as the ground element. The remaining prongs 111 and 113–115 are electrically spaced from the conductors 106 and 108–110 respectively, by an intermediate gap, and these gaps are aligned with respective slots 116–119 formed in the inner face of the housing.

To transmit electrical energy between adjacent panels, the flexible electrical connector 19 is plugged into the adjacent power blocks. For this purpose, the set of prongs 111–115 is inserted into the set of slots 35–39 associated with one of the recesses 28 and 29, which thus results in the prongs 111–115 being electrically engaged with the electrically conductive plates 51–55, respectively. This simultaneously results in insertion of the set of prongs 41–44 through the slots 116–119 so as to bridge the gaps between the conductors 106, 108–110 and the respective prongs 111–115.

Each of the housings 96 and 97 has a removable rear wall 121 for permitting convenient access to the wires disposed within the flexible connector.

The electrical system, in the illustrated embodiment, is a five-wire system which permits the supply conduit 73 to be connected to a conventional 208 volt, three-phase electrical potential source. Thus, as is readily understood, this permits the tapping off of three different 110-volt circuits.

Figure 10:
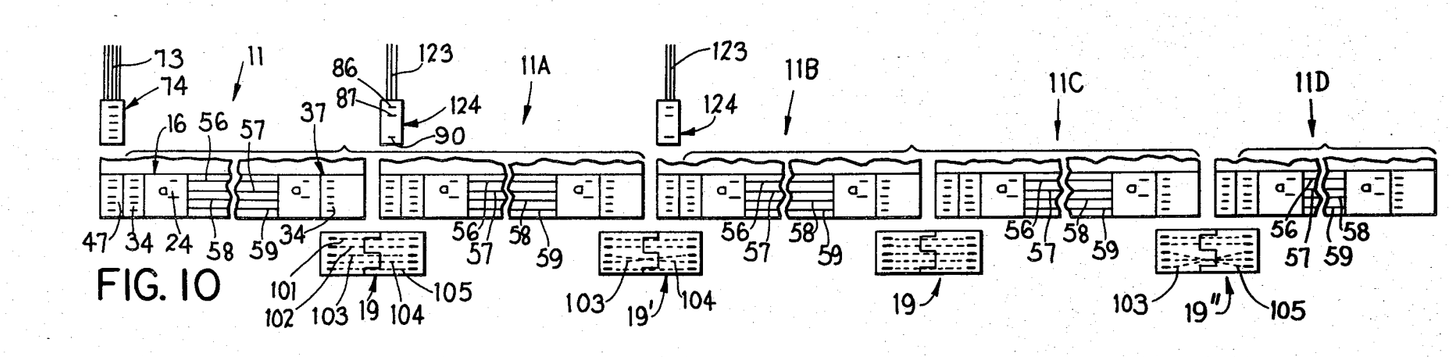
FIG. 10 diagrammatically illustrates several panels connected in series and the manner in which two or more electrical circuits can be provided thereon.
Figure 11:
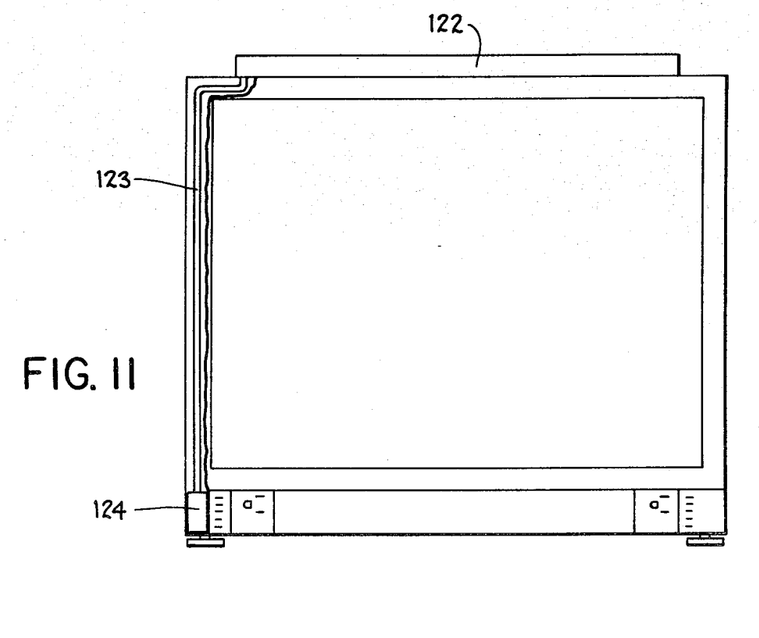
FIG. 11 diagrammatically illustrates a single panel and the provision of an electrical lighting fixture thereon.

In this respect, reference is made to FIGS. 10 and 11 which illustrate the improved electrical system and the resulting improved wall structure of this invention. FIG. 10 illustrates a plurality of substantially identical panels 11 through 11D connected in series. The series of panels are electrically energized from an external power source by the conduit 73 and its power connector 74, the latter being engaged with the connecting means 47 formed on the power block 16 of the panel 11. The plurality of panels are electrically connected in series by the flexible electrical connectors 19.

The first series of panels, represented by panels 11 and 11A, have all of the external receptacles 24 electrically connected to the same circuit, which circuit is defined by the two uppermost cables 56 and 57. These two cables, which are joined across two of the wires associated with the supply conduit 73, thus define a first 110-volt circuit.

However, since each circuit can normally handle only a selected number of external receptacles 24, the provision of only a single circuit thus limits the number of panels which can be connected in series. For this reason, the present invention permits connection of a second 110-volt circuit to the next series of panels as represented by panels 11B and 11C, so that the receptacles 24 associated with these latter panels are associated with a different circuit. This is accomplished by crossing one end of the internal wires 103 and 104 associated with the flexible connector 19', which crossing of the wires is performed manually after removing the back wall of the connector. In this manner, while the receptacles 24 associated with panels 11B and 11C are still connected across the electrical cables 56 and 57, nevertheless the lower cable 57 as associated with panel 11B is now series connected to the cable 58 of the panel 11A. In this manner, a simple reversal in two wires within the connector 19, resulting in the modified connector 19', results in the series of panels 11B and 11C having the receptacles 24 thereof connected to one circuit, whereas the receptacles 24 associated with the earlier series of panels 11 and 11A are connected to a different circuit.

Still a third circuit is provided due to the presence of the lowermost cable 59. This third circuit can be used in different manners. One potential use would be to provide still a further circuit for the receptacles 24, and such a third circuit is illustrated for the series connected panels 11D, and same is achieved by crossing one end of the wires 103 and 105 so as to form the modified connector 19". This thus results in the formation of a further circuit having receptacles 24 connected thereto.

Alternately, this third circuit can be utilized for energizing selected devices, such as lighting fixtures 122 (FIG. 11) which may be mounted on and comprise an integral portion of the panels. Such a fixture 122 has a suitable power supply conduit 123 extending interiorly through the frame of the panel and terminating in a plug-type power connector 124. The connector 124 is adapted to be releasably engaged with the connector means 47 associated with one of the power blocks. In fact, the connector 124 is identical to the power connector 74 except that two of the prongs, namely the prongs 88 and 89, are eliminated. This thus results in a power circuit being defined across the prongs 86 and 90, with the other prong 87 being connected to ground. This latter usage of the additional circuit thus permits lighting fixtures or the like as integrally associated with the individual panels to be energized from a circuit totally separate from those associated with the external receptacles 24. At the same time, the lighting fixtures can be easily added to the panels and energized inasmuch as they utilize a simple plug-type power connector 124 which can be easily engaged with the power block, and at the same time the resulting connector 124 is hidden interiorly of the panel when the flexible connectors 19 are mounted in position.

While the embodiment as illustrated utilizes a five-wire system which is thus adapted for a conventional 208 volt, three-phase potential, it will be appreciated that the present invention is equally adaptable for use with a conventional four-wire 220 volt, single-phase potential. In this instance, the supply conductor 73 would obviously be a four-wire system, and all of the components associated with the electrical system on the panels would likewise be a basic four-wire system. This is achieved merely by eliminating the lowermost cable 59, and by eliminating the lowermost prong and associated slot on each of the power blocks and flexible connectors. Such a four-wire system, as is readily recognized, permits only two 110-volt circuits, one of which would be connected to the receptacles 24 associated with the panels, and the other of which would be selectively utilized either for connection to the lighting fixtures or for creating a second circuit for the receptacles.

Figure 7:
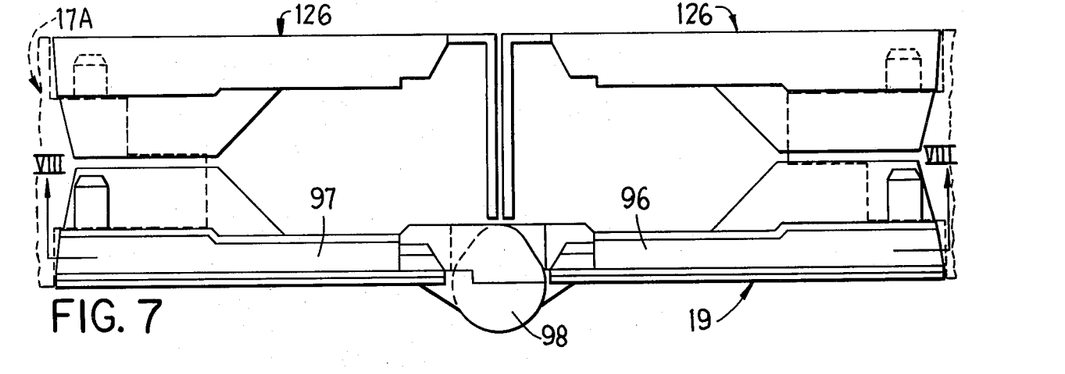
FIG. 7 is a fragmentary top view of the flexible connector associated with the power blocks of adjacent panels.

As shown in FIG. 7, dummy covers 126 are positioned within the power block recesses opposite the flexible connector 19. Also, instead of connecting to a ceiling-located power source, the wall structure can be connected to a wall or floor-located power source. Reference is made to copending application Ser. No. 737,420 wherein there is set forth a more detailed explanation as to both the structure, assembly and operation of the general wall structure and its associated electrical system.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a substantially freestanding space divider system formed from a plurality of series-connected upright prefabricated panels, some of said panels having a pair of electrical power blocks fixedly mounted thereon adjacent the opposite lower corners thereof and disposed substantially between the opposite sidewalls of the respective panel, cable means extending interiorly of the respective panel and electrically connecting together the pair of said power blocks as associated with said respective panel, some of said power blocks having a conventional electrical receptacle associated therewith and opening outwardly through the panel sidewall for permitting a conventional electrical plug to be inserted therein, flexible electrical connector means extending between the power blocks of adjacent series-connected panels for electrically connecting the power blocks together, said flexible connector means including connector parts disposed adjacent the opposite ends thereof and adapted for releasable electrical engagement with the connected power blocks, each connector part comprising one-half of a separable plug-type electrical connection, the other half of said plug-type electrical connection being integrally associated with the power block, and a power supply conduit releasably electrically connected to a selected one of said power blocks for supplying electrical energy to said series-connected panels, said power supply conduit having a connecting portion releasably engaged with said selected one power block, said power supply conduit having the other end thereof connectible to an electrical potential source, comprising the improvement wherein said power supply conduit includes five electrically conductive wires terminating in said connecting portion, each said power block having at least five electrical conductor members positioned therein and electrically insulated from one another, the five conductor members of said selected one power block being respectively and individually electrically connected to a selected one of said five wires, said flexible connector means including at least five internal conductive elements extending between and electrically connected to said connector parts, the receptacle associated with a first said series-connected panel being connected to a first pair of said conductor members as associated with the power block of the respective panel so that said receptacle as connected defines a first electrical circuit, the receptacle associated with a second said series-connected panel being connected to a second pair of said conductor members as associated with the power block of the respective panel so that said last-mentioned receptacle as connected defines a second electrical circuit which is different from said first electrical circuit, light fixture means mounted on at least one of said series-connected panels adjacent the upper edge thereof, an elongated electrical conductor connected to said light fixture means and extending downwardly through the interior of the respective panel and terminating in a pluglike connection means which is releasably engaged with the power block of said panel, said power block having connecting means associated therewith for releasable engagement with said pluglike connection means, said connecting means being connected to a third pair of said conductor members so as to define a third electrical circuit which is different from said first and second electrical circuits, whereby said lighting fixture means is connected to said third electrical circuit.

2. A system according to claim 1, wherein the flexible connector means which electrically joins adjacent first and second said panels has at least two of the internal conductive elements switched for reversing the first and second circuits as they extend from the first panel across to the second panel, whereby the receptacle associated with each of the first and second panels is identically connected to the same pair of said conductor members but the receptacles on said first and second panels are nevertheless connected to different electrical circuits due to the switching within said flexible electrical connector means.

3. In a substantially freestanding space divider system formed from a plurality of series-connected upright prefabricated panels, some of said panels having an electrical power block fixedly mounted thereon and disposed substantially between the opposite sidewalls of the respective panel, some of said power blocks having a conventional electrical receptacle associated therewith and opening sidewardly of the panel for permitting a conventional electrical plug to be inserted therein, flexible electrical connector means extending between the power blocks of adjacent series-connected panels for electrically connecting the power blocks together, said flexible connector means including connector parts disposed adjacent the opposite ends thereof and adapted for releasable electrical engagement with the connected power blocks, each connector part comprising one-half of a separable plug-type electrical connection, the other half of said plug-type electrical connection being integrally associated with the power block, and a power supply conduit releasably electrically connected to a selected one of said power blocks for supplying electrical energy to said series-connected panels, said power supply conduit having a connecting portion releasably engaged with said selected one power block, said power supply conduit having the other end thereof connectible to an electrical potential source, comprising the improvement wherein said power supply conduit includes at least four electrically conductive wires terminating in said connecting portion, each said power block having at least four electrical conductor members positioned therein, the four conductor members of said selected one power block being respectively and individually connected to a selected one of said wires, said flexible connector means including at least four internal conductive elements extending between and electrically connected to said connector parts, the receptacle as associated with one said panel being connected to a first pair of said conductor members as associated with the power block of the respective panel, whereby said receptacle as connected defines a first electrical circuit, and a second pair of said conductor members as associated with the power block of the respective panel defining a second electrical circuit, light fixture means mounted on said one panel adjacent the upper edge thereof, an elongated electrical conductor connected to said light fixture means and extending downwardly through the interior of the respective panel and terminating in pluglike connection means, the power block having receptacle means for releasable engagement with said plug-like connection means, said pluglike connection means when engaged with said receptacle means being connected across said second pair of conductor members so that the lighting fixture means is connected to said second electrical circuit.

4. A system according to claim 4, wherein said power block has a clearance space adjacent one side thereof for accommodating said connector part, said receptacle means being spaced inwardly of said power block so that said pluglike connection means is hidden and covered by said flexible connector means.

5. A substantially free-standing space divider system formed from a plurality of series-connected upright prefabricated panels, comprising in combination:

a first upright panel having first prewired electrical means extending longitudinally therealong for defining at least first and second electrical circuits, said electrical means including a pair of electrical power blocks fixedly mounted on said first panel adjacent the opposite lower corners thereof and at least four electrically conductive elements extending longitudinally of said panel for electrically connecting said pair of power blocks together, each said power block including a first multi-terminal connector means connected across a first pair of said conductive elements for defining said first circuit, said first connector means defining a receptacle for permitting a conventional electrical plug to be electrically connected to said first circuit, each said power block also having a pair of second multi-terminal connector means disposed in sidewardly spaced relationship relative to the width of the panel, each said second connector means being electrically connected to said four conductive elements, and each said power block further having a third multi-terminal connector means which is also connected to said four conductive elements for permitting electrical connection to both of said first and second circuits;

a second upright panel serially interconnected to said first panel, said second panel having second prewired electrical means mounted thereon and extending longitudinally therealong, said second prewired electrical means being identical to said first prewired electrical means;

flexible electrical connector means extending between the power blocks of adjacent series-connected panels for electrically connecting the power blocks together so that said first and second circuits extend through said series-connected panels, said flexible connector means including a pair of fourth multi-terminal connector means which are electrically joined together by at least four electrically conductive members for transmitting said first and second circuits therethrough, each of said fourth connector means being releasably engageable with one of said second connector means for creating a pluglike electrical connection therewith;

power supply conduit means releasably electrically connected to a selected one of the power blocks on one of said first and second panels for supplying electrical energy to said series-connected panels, said conduit means having at least four electrically conductive wires extending therethrough, said conduit means terminating in a fifth multi-terminal connector means which forms a releasable pluglike connection with the first connector means on said selected one power block for supplying electrical energy thereto so that said first and second electrical circuits can extend longitudinally through said series-connected panels; and light fixture means mounted on one of said first and second panels adjacent the top edge thereof, said light fixture means having electrical conduit means connected thereto and extending therefrom downwardly through the interior of the respective panel and terminating in a sixth multi-terminal connector means which forms a releasable pluglike connection with said first connector means associated with one of the remaining power blocks, said sixth connector means having means which when engaged with said first connector means is electrically coupled solely to said second electrical circuit.

6. A system according to claim 5, wherein said power conduit means, said prewired electrical means and said flexible electrical connector means define a third electrical circuit which extends longitudinally through said series-connected panels, and wherein one of said flexible electrical connector means as joined between an adjacent pair of said panels has two of the internal electrically conductive members switched for reversing the first and third circuits so that the first connector means associated with one panel are joined to the first circuit whereas the first connector means associated with the other panel are joined to the third circuit even though the prewired electrical means associated with said two panels are identical.

7. A system according to claim 5, wherein said power block includes an electrically nonconductive housing having at least four electrically conductive plates mounted therein and respectively connected to said four electrically conductive elements, said third connector means including an array of four slots formed in said housing for communication with the four conductive plates, said fifth connector means comprising a pluglike part having at least four projecting conductive prongs which are insertable through the four slots associated with said third connector means, and said sixth connector means comprising a pluglike part having two less conductive prongs than said fifth connector means so that when said sixth connector means is plugged into the slots associated with said first connector means it is electrically connected solely to said second circuit.

* * * * *

UNITED STATES PATENT AND TRADEMARK OFFICE
CERTIFICATE OF CORRECTION

PATENT NO. : 4,377,724
DATED : March 22, 1983
INVENTOR(S) : Harold R. Wilson

It is certified that error appears in the above-identified patent and that said Letters Patent is hereby corrected as shown below:

Col. 10, line 31; change "claim 4" to ---claim 3---.
Col. 11, line 24; change "first" to ---third---.
Col. 11, line 36; change "first" to ---third---.
Col. 12, line  3; change "first" to ---third---.
Col. 12, line 34; change "first" to ---third---.

Signed and Sealed this

Twenty-third Day of August 1983

[SEAL]

Attest:

GERALD J. MOSSINGHOFF

Attesting Officer

Commissioner of Patents and Trademarks